July 11, 1967

G. HIRSCHFELD ET AL  3,330,173

APPARATUS FOR PERFORMING THE POSITIONING, WORKING AND
RETURNING MOVEMENTS OF THE TOOL
SLIDE OF AN AUTOMATIC LATHE

Filed July 13, 1964

Inventors
Günter HIRSCHFELD
and Herbert SCHNEIDER

By Toulmin & Toulmin

Atty

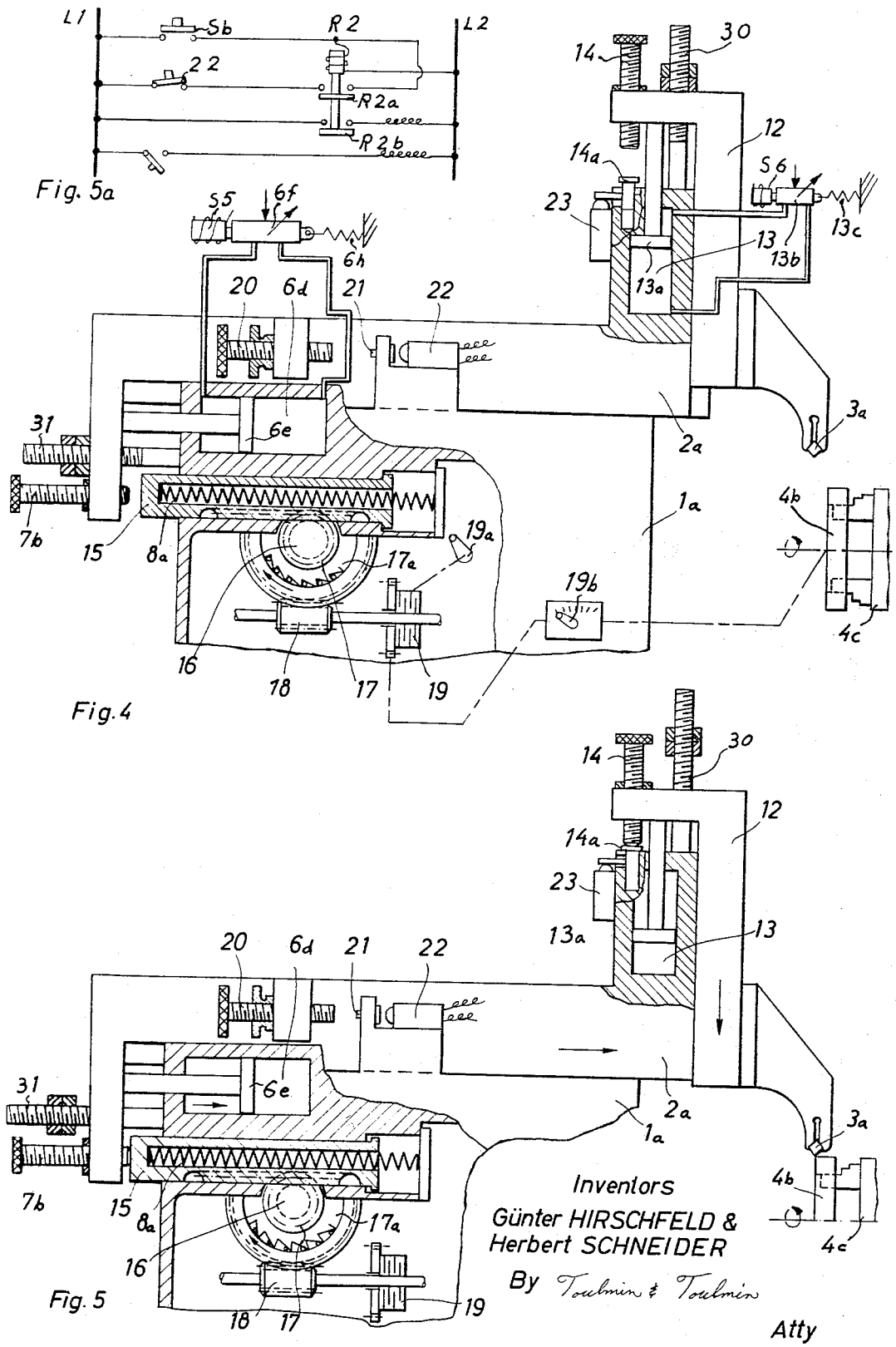

United States Patent Office 3,330,173
Patented July 11, 1967

3,330,173
APPARATUS FOR PERFORMING THE POSITIONING, WORKING AND RETURNING MOVEMENTS OF THE TOOL SLIDE OF AN AUTOMATIC LATHE
Günter Hirschfeld, Fullsichel, and Herbert Schneider, Rosenweg, Germany, assignors to Goetzewerke Friedrich Goetze A.-G., Burscheid, Germany
Filed July 13, 1964, Ser. No. 382,159
Claims priority, application Germany, July 31, 1963, G 38,365
3 Claims. (Cl. 82—21)

This invention relates to machine tools and is particularly concerned with an appartus for controlling the movement of a tool carrying slide, such as the cross slide of a lathe. More particularly still the invention relates to an apparatus for controlling the movement of a tool carrying slide so that the tool slide can move rapidly to and from the workpiece to be cut by a tool therein while the feed movement of the tool slide during an actual machining operation is controlled, preferably in accordance with the rotation of the main spindle of the machine.

In a machine tool such as an automatic lathe, the tool carrying slide, during rapid traverse and rapid retraction thereof must move at a velocity of from about twelve to fifteen meters per minute for economical operation of the machine tool. Further, within the short space of about $\frac{1}{10}$ mm. during the advancing travel of the tool slide, the tool slide must be switched over to a slow feeding movement for carrying out the cutting operation. Preferably, the feeding movement is under the control of the main spindle of the machine so that the feeding movement will be in conformity with the surface speed of the workpiece being turned. It will be apparent that it is important to adjust the limits of movement of the tool slide during which it is moving rapidly so that the machine tool operates at maximum efficiency. The present invention is particularly concerned with an apparatus of this nature and is more particularly concerned with an apparatus wherein the rapid advance and retraction movement of the tool slide takes place under the action of a hydraulic medium while the slow feeding movement of the tool slide is controlled mechanically.

During the last-mentioned feed movement of the tool slide, the hydraulic medium provides the driving power for the tool slide while the mechanical devices connected to the tool slide effect a speed controlling or regulating influence thereon.

The apparatus includes adjustable stop screws and switch actuating screws and the like for rapid and accurate adjustment of the limits of movement of the tool slide and the point of shift over thereof.

In one modification of the present invention, the tool slide carries a resiliently biased roller engageable with a cam driven by the machine tool spindle and which spring biased roller controls a limit switch operable for controlling the connection of the aforementioned cam to the machine tool spindle and also for initiating retraction of the tool slide at the end of a feeding operation.

The aforementioned cam is spiral, such as a spiral of Archimedes and preferably has a pitch such that the cam does not tend to be driven by the roller when the two are in engagement. Still further, the cam preferably has a predetermined initial rest position to which it is returned after each cutting cycle so that the cam always starts from the same place, and exact synchronization of all parts of the apparatus is easily accomplished.

In another form of the invention the mechanical control element comprises a rack and a pinion with a one-way clutch located between the rack and the machine tool spindle to provide a uni-directional driving connection that will be effective for controlling the rate of movement of the tool slide in its feeding direction only while permitting free movement of the tool slide in the opposite direction.

The tool slides referred to above can also be provided with a transverse slide for advancing and retracting a tool toward a workpiece whereas the first mentioned tool slide will then be effective for controlling the rate of movement of the tool along the workpiece after it is engaged therewith. The two slides are preferably interlocked to operate in a certain sequence.

With the foregoing in mind, it will be evident that the present invention has as a primary object a control system for controlling the rapid advance and rapid retraction and feed movement of the tool slide in a machine tool.

Another object of this control arrangement is for controlling the tool slide of a machine tool for rapid advance and rapid retraction and said units utilizing a combination of hydraulic and mechanical actuating and control components.

A still further object of this invention is the provision of a combination of a hydraulic and mechanical control arrangement for controlling the tool slide means in a machine tool during rapid advance, rapid retraction, and feed movements thereof in which the limits of movement of the tool slide means and the point of shift over thereof from rapid advance to feed movement and from feed movement to rapid retraction can be easily and accurately adjusted.

These and other objects and advantages of this invention will become more apparent upon reference to the following specification taken in connection with the accompanying drawings, in which:

FIGURE 4 is a view of another embodiment of the present invention showing a tool slide carrying a transverse slide and with the slide located in retracted position;

FIGURE 5 is a view of the FIGURE 4 embodiment showing the transverse slide in advance position and with the longitudinal or tool slide commencing to advance movement, and FIGURE 5a is a somewhat schematic representation of an electric control circuit for controlling the embodiment of FIGURES 4 and 5.

Figure 1:
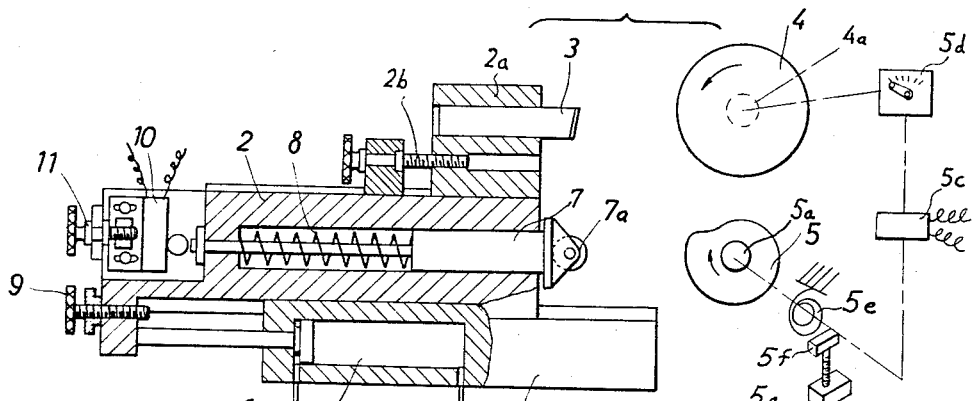
FIGURE 1 shows somewhat schematically one embodiment of the present invention with the tool slide shown in its fully retracted position.
Figure 2:
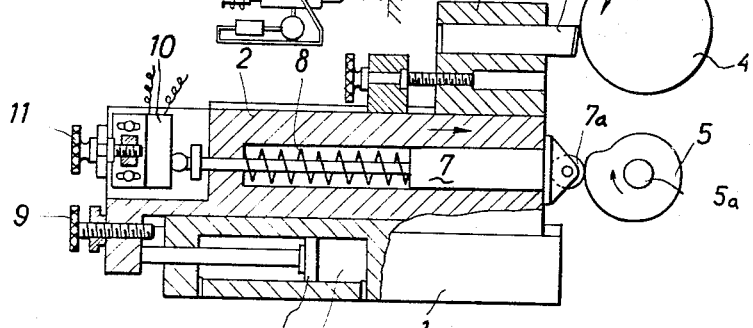
FIGURE 2 shows the arrangement of FIGURE 1 but with the tool slide in the position it occupies at the instant of shifting over from rapid advance to feed movement.
Figure 3:
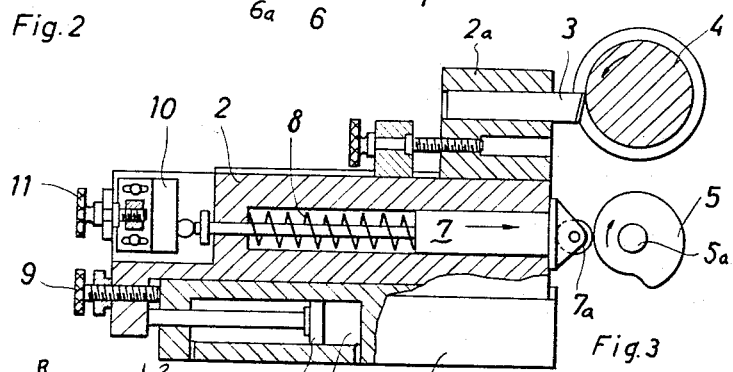
FIGURE 3 shows the embodiment of FIGURE 1 with the tool slide stopped at the end of the feed movement thereof and immediately prior to initiation of the rapid retracting movement thereof which will return the tool slide to its FIGURE 1 position.

Referring to the drawings somewhat more in detail, FIGURES 1 to 3 show a bed 1 having a tool slide 2 mounted thereon, a lathe cross slide for example. Base 1 is formed with or carries a cylinder 6 having therein a piston 6a having its rod connected to slide 2. Slide 2 carries a block 2a in which cutting tool 3 is fixed and with block 2a being adjustable on the tool slide as by adjusting screw means 2b. The tool 3 is operable for cutting a workpiece 4 mounted on the work axis of the machine tool and driven in rotation by a spindle mechanism 4a.

The movement of slide 2 toward and away from the work axis of the machine tool is accomplished by reversibly supplying fluid to cylinder 6 from a reversing valve 6b is biased by spring 6c in a direction to supply fluid to the right hand end of cylinder 6 which will cause slide 2 move leftwardly or in its retracting direction. Energization of solenoid S1 however will shift valve 6b to reverse the supply of fluid to cylinder 6 whereupon piston 6a will be thrust rightwardly and this will move slide 2 rightwardly or in the advancing direction.

Slide 2 carries a plunger 7 biased in the advancing direction of slide 2 by a spring 8. Plunger 7 has a roller 7a at its outer end adapted for engagement with spiral cam 5 during the advancing movement of slide 2 and immediately prior to the engagement of workpiece 4 by cutting tool 3. Cam 5, which can advantageously be formed as a spiral of Archimedes, having a uniform rise from its low point to its high point, is preferably of such a pitch or inclination that roller 7a has no tendency to drive cam 5.

Cam 5 is mounted on a shaft 5a which is adapted for connection via normally open electrically operable clutch 5c with spindle 4a by way of an adjustable speed transmission 5d.

Shaft 5a is preferably biased by a spring 5e in a direction opposite to the direction in which it is driven by spindle 4a, said direction being indicated by the arrow on cam 5 so that upon disengagement of clutch 5c spring 5e will return the cam to its starting position. This starting position is accurately determined by abutment 5f on shaft 5a which engages stationarily but adjustably mounted stop screw 5g when the cam is in its rest position.

Plunger 7 at its end opposite roller 7a is adapted for actuating engagement with a limit switch 10 when the plunger is pushed inwardly in slide 2 against the bias of spring 8 by engagement of cam 5 by roller 7a. Limit switch 10 is preferably mounted on a carrier adjustable by adjusting screw 11 in the direction of travel of the tool slide 2.

Slide 2 also carries an adjustable stop screw 9 which engages base or bed 1 when the slide 2 reaches its predetermined maximum advanced position.

Figure 3A:
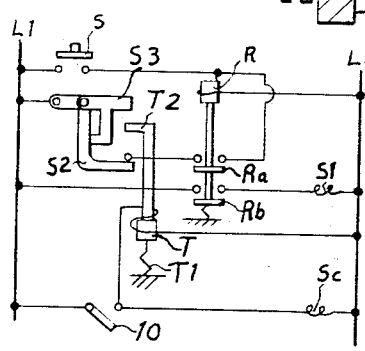
FIGURE 3a is a somewhat schematic representation of an electric control circuit for controlling the embodiment of FIGURES 1 to 3.

FIGURE 3a shows an electric control for the embodiment of FIGURES 1 through 3. In this figure, a start switch S is provided which when closed will energize a relay R that has a holding circuit through its blade Ra. A second blade Rb of the relay is in circuit with solenoid S1 of valve 6b.

The aforementioned limit switch 10, which is normally open, is in circuit with the actuating coil of an electric clutch 5c. This last-mentioned limit switch is also in circuit with the actuating coil of an electrically operated trip member T that is operable for opening a switch S2 in the holding circuit of relay R.

In operation, assuming the parts of the apparatus are in their FIGURE 1 position, switch S is closed thereby energizing solenoid S1 to cause shifting of valve 6b, thereby initiating rapid rightward movement of tool slide 2 toward the work axis of the machine tool.

Before tool 3 engages workpiece 4, roller 7a will engage cam 5 and this will push plunger 7 into slide 2 against the bias of spring 8 and bring about closing of switch 10.

The aforementioned closing of switch S resulted in energization of relay R which closed its holding blade Ra and also closed its blade Rb, which later effected energization of valve solenoid S1. Upon closing of switch 10, the actuating coil of clutch 5c is energized and this will effect driving connection of spindle 4a with shaft 5a of cam 5 so that cam 5 will commence to turn in the clockwise direction as indicated by the arrow thereon, thus permitting tool slide 2 to move toward the work axis of the machine at a controlled rate.

After a predetermined amount of feed movement of slide 2, stop screw 9 will abut bed or base 1 and halt tool slide 2 while cam 5 will continue to rotate. This further rotation of cam 5 will permit plunger 7 to be returned to the influence of spring 8 and switch 10 will be permitted to open. Opening of switch 10 will de-energize the actuating solenoid of electric clutch 5c and thus disconnect shaft 5a of cam 5 from spindle 4a whereupon cam 5 and its shaft 5a will be returned by spring 5e to the starting position of the cam which is determined by stop elements 5f and 5g.

Opening of switch 10 will also de-energize trip mechanism T, and during downward movement of this trip mechanism under the influence of its biasing spring T1, the offset portion T2 of the trip mechanism which, at this time, is positioned above the pivoted finger S3 of switch S2, will engage the said finger and open switch S2 thereby interrupting the holding circuit of relay R to drop the relay open. Opening of the relay opens its blades Ra and Rb and solenoid S1 is thereby de-energized so that spring 6c will shift valve 6b into position to bring about rapid retraction of slide 2 to its FIGURE 1 position.

With regard to the modification of FIGURES 4 and 5, there is a machine bed 1a, and slidable thereon is a carriage 2a which, in turn, supports a tool carriage 12 for movement at right angles to the direction of movement of carriage 2a. Tool slide 12 carries a tool 3a for operating a workpiece 4b mounted on rotary spindle 4c.

Bed 1a carries a cylinder 6d in which is piston 6e connected with carriage 2a. Reversing valve 6f controls the supply of fluid to cylinder 6d and has a valve member movable by a spring 6h into position to cause retracting or leftward movement of carriage 2a. Energization of a solenoid S5 will shift the valve member of valve 6f in a direction to cause advancing or rightward movement of carriage 2a.

Carriage 2a carries a cylinder 13 in which is a piston 13a connected with tool slide 12. Connected to cylinder 13 is a reversing valve 13b having a valve member urged by spring 13c into position to cause retracting or upward movement of tool slide 12, while energization of a solenoid S6 will shift the valve member to cause downward or advancing movement to slide 12. Retracting movement to tool slide 12 is stopped by adjustable stop screws 30, while in its advancing movement, adjustable screw 14 carried by the tool slide is adapted for actuating the switch operating element 14a that will actuate limit switch 23 when tool slide 12 is fully advanced.

Carriage 2a on the other hand is stopped in its retracting movement by adjustable stop members 31, while in its advancing movement, a screw 7b on carriage 2a will abut the end of a plunger 15 spring loaded by a spring 8a mounted in bed 1a. Plunger 15 is in the form of a rack and engages pinion 16 that has connected thereto one part of an over-running or a one way drive clutch 17 the other part of which is formed as a worm wheel 17a which meshes with worm 18. Worm 18 is mounted on a shaft adapted for connection via a clutch 19 and change speed unit 19b with spindle 4c. An actuating lever 19a pertaining to clutch 19 is available for selectively opening and closing the clutch.

In the fully advanced position of carriage 2a adjustable screw 20 carried thereby is engageable with switch actuating element 21 which will actuate switch 22.

The operation of the modification of FIGURES 4 and 5 will be best understood upon reference to the diagrammatic electric control circuit of FIGURE 5a. In FIGURE 5a the power lines are indicated at L1 and L2, and upon closing of switch SB, the actuating coil of relay R2 is energized, whereupon this relay closes and sets up a holding circuit for itself through its blade R2a and normally closed limit switch 22.

Closing of relay R2 also closes a blade R2b thereof which is in circuit with solenoid S6, whereupon valve 13b is shifted in a direction to cause advancing or downward movement of tool slide 12 thereby to bring cutting tool 3a carried thereby into proper alignment with workpiece 4b carried by spindle 4c.

When slide 12 is fully advanced, screw 14 carried thereby via actuating element 14a will engage and close limit switch 23. As will be seen in FIGURE 5a, closing of limit switch 23 will bring about energization of solenoid S5 which will cause rightward movement of carriage 2a, thus causing cutting tool 3a to move into operative cutting engagement with workpiece 4b as is illustrated in FIGURE 5.

At about the time the cutting tool reaches cutting position, screw 7b will abut the end of rack plunger 15 and thereafter movement of carriage 2a will be under the control of one way drive clutch 17 which, in turn, is under the control of spindle 4c. The advancing movement of the tool into the workpiece thus bears a predetermined relation to the speed of rotation of spindle 4c as determined by the setting of the change speed transmission 19b.

When carriage 2a reaches its fully advanced position, screw 20 will engage switch actuating element 21 and open switch 22. Opening of switch 22 will de-energize relay R2 and this, in turn, will de-energize valve solenoid S6 so the tool slide 12 will commence immediately to move in its upward or retracting direction. The aforementioned movement upwardly of tool slide 12 will release limit switch 23 which will open and thereby de-energize valve solenoid S5 so that carriage 2a will also commence in its retracting or leftward direction. The retracting movement of carriage 2a is not impeded by one way clutch 17 because the speed control arrangement is ineffective in this direction of movement of the carriage 2a.

The two carriages will return to their stopped retracted positions in which they are illustrated in FIGURE 4, and a new cycle will be commenced after the now machined workpiece 4b has been exchanged for an unmachined workpiece, and switch SB is closed.

The arrangement according to the present invention is quite simple and relatively inexpensive, but can be adjusted accordingly with respect to the amount of retracting movement of the slide or slides and the point at which the tool commences its feed movement into the workpiece, and the point at which retraction of the tool from the workpiece is initiated.

It will be understood that this invention is susceptible to modification in order to adapt it to different usages and conditions; and accordingly, it is desired to comprehend such modifications within this invention as may fall within the scope of the appended claims.

What is claimed is:

1. In a machine tool; a bed, a spindle rotatable on the bed, tool slide means slidable on the bed, hydraulic motor means operatively connected between the bed and slide means to advance a tool in the slide means into cutting relation with a workpiece carried by the spindle, mechanical means driven by said spindle for controlling the speed of movement of said slide means, and control means operated by said slide operable for making said spindle driven means effective at a predetermined point during the advancing travel of the slide, said spindle driven mechanical means being ineffective during retracting travel of said slide means and during advancing travel of said slide means prior to said slide means reaching said predetermined point, said spindle driven mechanical means including a one way drive clutch having one part driven by the spindle and another part engageable with the slide means during advancing travel of the slide means.

2. A machine tool according to claim 1 in which said other part of the one way clutch includes a pinion, a rack slidable in the bed, and means on the slide means to engage said rack during advancing travel of the slide means.

3. A machine tool according to claim 2 in which said slide means includes a first slide movable in the direction of the spindle axis and a second slide movable on the first slide in a direction transverse to the spindle axis and carrying the cutting tool, means to initiate advancing movement of said second slide, switch means under the control of said second slide for initiating the advancing movement of said first slide, and other switch means under the control of said first slide for initiating the retracting movement of both slides.

References Cited

UNITED STATES PATENTS

| 1,909,165 | 5/1933 | Burrell. |
| 1,936,756 | 11/1933 | Flanders. |
| 2,720,130 | 10/1955 | Chang. |

FOREIGN PATENTS

| 1,382,649 | 11/1964 | France. |
| 364,159 | 11/1962 | Switzerland. |

WILLIAM W. DYER, JR., *Primary Examiner.*

LEONIDAS VLACHOS, *Examiner.*